United States Patent
Subasingha et al.

(10) Patent No.: US 11,561,292 B1
(45) Date of Patent: Jan. 24, 2023

(54) ACTIVE POWER CONTROL OF SENSORS

(71) Applicant: Zoox, Inc., Foster City, CA (US)

(72) Inventors: Subasingha Shaminda Subasingha, Weston, FL (US); Turhan Karadeniz, Oakland, CA (US); Robert Nicholas Moor, San Mateo, CA (US); Mehran Ferdowsi, San Mateo, CA (US); Denis Nikitin, Campbell, CA (US)

(73) Assignee: Zoox, Inc., Foster City, CA (US)

( * ) Notice: Subject to any disclaimer, the term of this patent is extended or adjusted under 35 U.S.C. 154(b) by 735 days.

(21) Appl. No.: 16/550,156

(22) Filed: Aug. 23, 2019

(51) Int. Cl.
G01S 7/486 (2020.01)
G01S 17/10 (2020.01)
G01S 17/88 (2006.01)
G01S 7/48 (2006.01)

(52) U.S. Cl.
CPC .......... *G01S 7/4868* (2013.01); *G01S 7/4808* (2013.01); *G01S 17/10* (2013.01); *G01S 17/88* (2013.01)

(58) Field of Classification Search
CPC ...... G01S 7/4868; G01S 7/4808; G01S 17/10; G01S 17/88
See application file for complete search history.

(56) References Cited

U.S. PATENT DOCUMENTS

| | | | |
|---|---|---|---|
| 9,760,837 B1 * | 9/2017 | Nowozin | ............... G01S 7/4808 |
| 10,972,638 B1 * | 4/2021 | Waschura | ................. G06T 7/73 |
| 10,999,524 B1 * | 5/2021 | Duelli | ................... H04N 5/2352 |
| 2018/0365847 A1 * | 12/2018 | Miyata | .................. G06T 7/0002 |

* cited by examiner

*Primary Examiner* — Marthe Y Marc-Coleman
(74) *Attorney, Agent, or Firm* — Lee & Hayes, P.C.

(57) ABSTRACT

Sensors, including time-of-flight sensors, may be used to detect objects in an environment. In an example, a vehicle may include a time-of-flight sensor that images objects around the vehicle, e.g., so the vehicle can navigate relative to the objects. Sensor data generated by the time-of-flight sensor can return unreliable pixels, e.g., in the case of over- or under-exposure. In some examples, parameters associated with power of a time-of-flight sensor can be altered based on a number of unreliable pixels in measured data and/or based on intensity values of the measured data. For example, unreliable pixels can be determined using phase frame information captured at a receiver of the sensor.

20 Claims, 6 Drawing Sheets

ACTIVE POWER CONTROL OF SENSORS

BACKGROUND

Time-of-flight sensors may be unreliable in certain environments, including environments with varied lighting and/or environments containing objects with different reflective and absorptive properties. For instance, reflections off objects that are extremely close to the sensor, reflections off objects that have high reflectivity, and/or other high-illumination situations can result in unreliable pixel data. Unreliable pixel data may result in increased processing time to better understand the data and/or decreased efficiency in identifying and/or characterizing objects in the data. Worse, such high reflectivity may cause saturation, making it impossible to infer any information about the scene. When the time-of-flight sensor is intended for use on an autonomous vehicle, unreliable data can be a hindrance to identifying and/or characterizing potential obstacles to travel, thereby reducing safety.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

DETAILED DESCRIPTION

Figure 1:
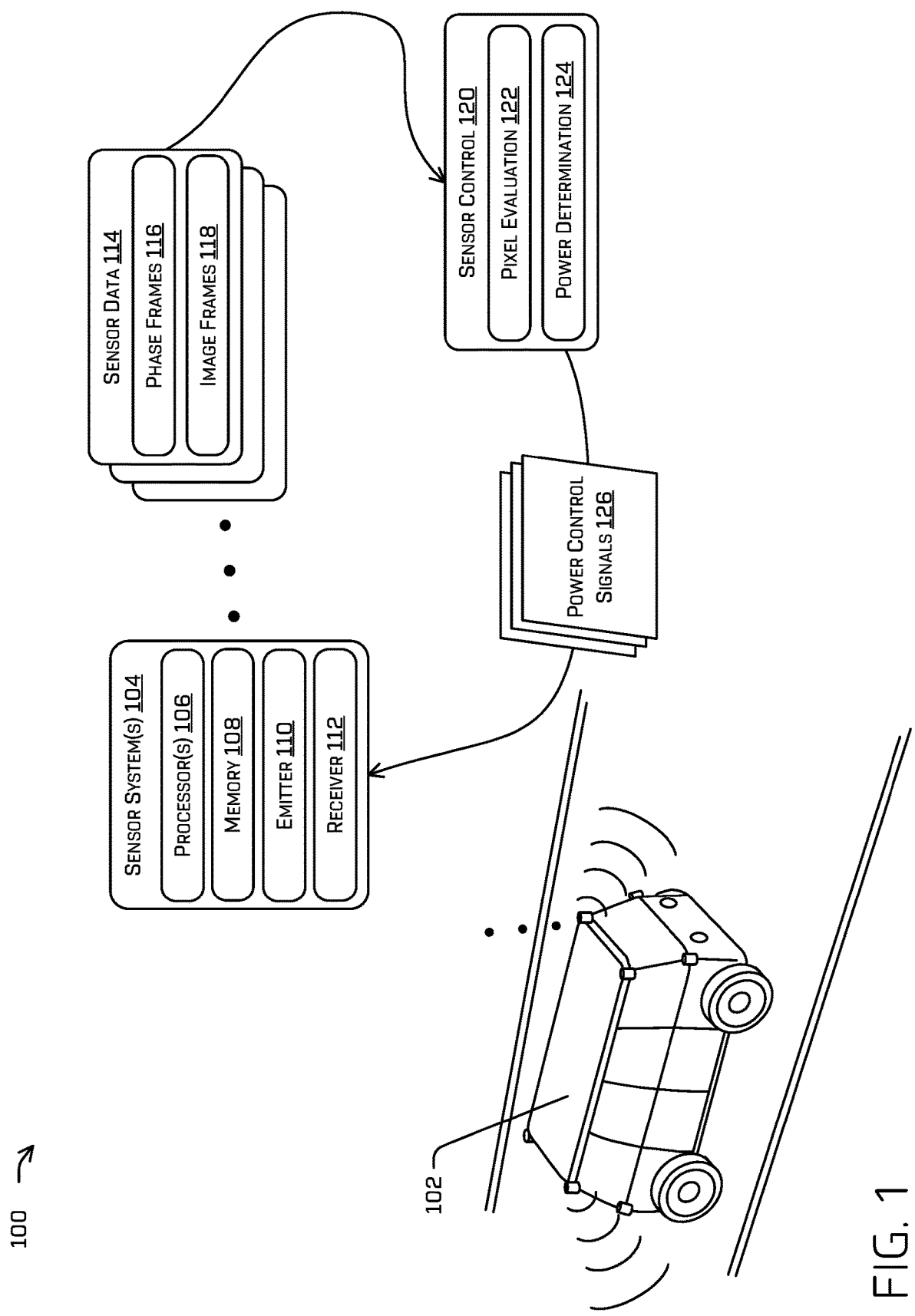
FIG. 1 is a schematic illustration showing an example vehicle, such as an autonomous vehicle, and example components and functionality of a sensor system associated with the vehicle, as described herein.

This disclosure describes methods, apparatuses, and systems for generating sensor data that can be used to identify objects in an environment and to control a vehicle relative to those identified objects. For example, an autonomous vehicle can include a plurality of sensors to capture sensor data corresponding to an environment of the vehicle. The sensor data can include data associated with the environment, which, in some instances, can include multiple objects (e.g., pedestrians, vehicles, bicyclists, etc.). Oftentimes, different sensor modalities are used for robustness purposes and/or because of inherent shortcomings in the sensors. For example, time-of-flight sensors, relative to other sensor types, may generate sensor data more quickly and/or may be more reliable at shorter ranges. As a result of these characteristics, some vehicle implementations may use time-of-flight sensors in safety critical applications, e.g., to recognize objects in close proximity to the vehicle and/or to avoid imminent collisions. However, in some instances intensity and distance information generated by time-of-flight sensors may be unreliable due to one or more of oversaturation, glare caused by highly reflective objects, pixel noise from stray light, under exposure, ambiguous returns, or the like. Techniques described herein can be used to improve sensor data, including time-of-flight sensor returns. For example, techniques disclosed herein may actively control illumination and sensing parameters based on pixel information to provide improved sensor returns. Improved sensor data may result in a better understanding of the environment of the sensor, and, when the sensor is associated with a vehicle, techniques described herein can lead to safer navigation and/or more confident controlling of the vehicle.

As discussed herein, sensor data can be captured by one or more sensors, which can include time-of-flight sensors, RADAR sensors, LiDAR sensors, SONAR sensors, image sensors, microphones, or any combination thereof. The sensor can include an emitter to emit a signal and a sensor to sense a return signal from the environment. In the context of a time-of-flight sensor, the captured sensor data can be represented, for example, in a raw (e.g., a quadrature) format. In some instances, the sensor data in the quadrature format can include one or more pixels where each pixel can be represented as a numerical value (e.g., 12 bits with a value range of $2^{-11}$ to $(2^{11}-1)$). After determining the sensor data in the quadrature format, a sensor computing device (e.g., an FPGA, SoC, ASIC, CPU, etc.) can determine the sensor data in an intensity and depth format. In some instances, the intensity and depth format can include an intensity image and a depth image having, respectively, per-pixel intensity and depth values. In some implementations, the sensor computing device can also, using the sensor data in the intensity and depth format, perform an unprojection operation to determine the sensor data in an unprojected format to project each pixel in the sensor data into a multi-dimensional space (e.g., 3D-space using an x-position, a y-position, and a z-position).

In implementations described herein, a sensor, a sensor computing device, and/or another computing system in communication with the sensor can generate controls to actively change sensing parameters, e.g., illumination power/intensity and/or integration time, based on sensed data. As a result, the sensor may be adjusted depending upon attributes of a sensed environment, thereby providing a more reliable dataset. As described above, many factors, such as saturation, underexposure, stray light, and the like, can degrade sensor data quality. Actively controlling sensor parameters may minimize these factors.

In some examples, systems and techniques described herein for actively controlling a sensor to improve sensed data can include receiving image data from a sensor, such as a time-of-flight sensor. For example, the time-of-flight sensor may generate raw data, e.g., as phase frames or phase values, corresponding to directly to a received (reflected) carrier signal, and/or processed data based on the raw data, e.g., image data including intensity information, depth information and the like. In examples, the intensity information may include an intensity image that associates measured intensity values with pixels in the image. The intensity values may be based on the phase values received by the sensor.

In implementations described herein, the sensor and/or the sensor computing device can vary attributes of the sensor and/or processes using the sensor to generate improved sensor data. For example, some implementations can include varying an integration time, e.g., the time over which the return (reflected) signal is received. For instance, increasing the integration time can allow reflected signals to be received for a longer period of time, which can increase fidelity in low-light and/or for objects at a farther distance. In contrast, decreasing the integration time will reduce the time over which the reflected signal is received, which can reduce over-saturation, for example. Also in examples, the power of the illumination source can be changed to achieve similar results. A higher illumination power will increase signal strength (and thereby return signal strength), which can help prevent underexposure, whereas a lower illumination power can limit overexposure and/or saturation.

In some examples, different configurations for the time-of-flight sensor may be determined dynamically. For example, the integration time and/or illumination power can be varied based on attributes of pixels, e.g., on an image-by-image basis. For instance, implementations can investigate raw data, e.g., phase frames, to determine whether received data comports with one or more expected characteristics of a return signal. In some implementations, phase values that do not comport with such characteristic(s) may be identified as "bad" or unreliable pixels, e.g., because the data is not as expected. In some examples, when a number of bad pixels exceeds a threshold number (or threshold ratio of bad to "good" pixels), the integration time and/or illumination power can be varied. Also in examples, information about the bad pixels may be used to determine how and/or how much to vary. For example, techniques described herein can determine a saturation value for the image based on the number of bad pixels and/or based on intensity information associated with those pixels. For instance, when there are relatively more bad pixels and/or the bad pixels have relatively higher intensities, a higher saturation value may be calculated. In contrast, when the bad pixels have a relatively lower intensity, a lower saturation value may be determined.

In still further examples, one or more histograms, e.g., associated with the intensity image, can be used to determine the saturation value and/or integration time and/or power controls. For example, when a histogram indicates a relatively high intensity across the image, the saturation value can be relatively higher, which may indicate that the integration time and/or power can be reduced. Conversely, a relatively low intensity across the image could result in a relatively lower saturation value, which may indicate an increase in the integration time and/or illumination power.

In some examples, image data generated using the techniques described herein may be provided to, received by, or otherwise accessed by a computing device of an autonomous vehicle. For instance, the autonomous vehicle may use the image data to determine one or more trajectories for proceeding relative to objects determined from the filtered data. In some instances, depth and/or intensity information identified according to filtering techniques described herein may be combined, or fused, with data from other sensor modalities to determine the one or more trajectories.

Techniques described herein may be directed to leveraging sensor and perception data to enable a vehicle, such as an autonomous vehicle, to navigate through an environment while circumventing objects in the environment. Techniques described herein can utilize information sensed about the objects in the environment, e.g., by a time-of-flight sensor, to improve sensor data and more accurately determine features of the objects. For example, techniques described herein may be faster and/or more robust than conventional techniques, as they may increase the reliability of depth and/or intensity information, potentially alleviating the need for extensive post-processing, duplicate sensors, and/or additional sensor modalities. That is, techniques described herein provide a technological improvement over existing sensing, object detection, classification, prediction and/or navigation technologies. In addition to improving the accuracy with which sensor data can be used to determine objects and correctly characterize motion of those objects, techniques described herein can provide a smoother ride and improve safety outcomes by, for example, more accurately providing safe passage to an intended destination.

While this disclosure uses an autonomous vehicle in examples, techniques described herein are not limited application in autonomous vehicles. For example, any system in which inconsistent sensor data exists, e.g., caused at least in part by glare, may benefit from the techniques described. By way of non-limiting example, techniques described herein may be used on aircrafts, e.g., to correct intensities and/or depths associated with objects in an airspace or on the ground. Moreover, non-autonomous vehicles could also benefit from techniques described herein, e.g., for collision detection and/or avoidance systems. The techniques described herein may also be applicable to non-vehicle applications. By way of non-limiting example, techniques and implementations described herein can be implemented in any system, including non-vehicular systems, that generates, uses, and/or outputs sensor data, such as time-of-flight sensor data.

FIGS. 1-6 provide additional details associated with the techniques described herein.

FIG. 1 illustrates an example environment 100 through which an example vehicle 102 is traveling. The example vehicle 102 can be a driverless vehicle, such as an autonomous vehicle configured to operate according to a Level 5 classification issued by the U.S. National Highway Traffic Safety Administration. The Level 5 classification describes a vehicle capable of performing all safety-critical functions for an entire trip, with the driver (or occupant) not being expected to control the vehicle at any time. In such examples, because the vehicle 102 can be configured to control all functions from start to completion of the trip, including all parking functions, the vehicle may not include a driver and/or controls for manual driving, such as a steering wheel, an acceleration pedal, and/or a brake pedal. This is merely an example, and the systems and methods described herein may be incorporated into any ground-borne, airborne, or waterborne vehicle, including those ranging from vehicles that need to be manually controlled by a driver at all times, to those that are partially or fully autonomously controlled.

The example vehicle 102 can be any configuration of vehicle, such as, for example, a van, a sport utility vehicle, a cross-over vehicle, a truck, a bus, an agricultural vehicle, and/or a construction vehicle. The vehicle 102 can be powered by one or more internal combustion engines, one or more electric motors, hydrogen power, any combination thereof, and/or any other suitable power source(s). Although the example vehicle 102 has four wheels, the systems and methods described herein can be incorporated into vehicles having fewer or a greater number of wheels, tires, and/or tracks. The example vehicle 102 can have four-wheel steering and can operate generally with equal performance characteristics in all directions. For instance, the vehicle 102 may be configured such that a first end of the vehicle 102 is the front end of the vehicle 102, and an opposite, second end of the vehicle 102 is the rear end when traveling in a first direction, and such that the first end becomes the rear end of the vehicle 102 and the second end of the vehicle 102 becomes the front end of the vehicle 102 when traveling in the opposite direction. Stated differently, the vehicle 102 may be a bi-directional vehicle capable of travelling forward in either of opposite directions. These example characteristics may facilitate greater maneuverability, for example, in small spaces or crowded environments, such as parking lots and/or urban areas.

A vehicle such as the example vehicle 102 can be used to travel through an environment and collect data. For example, the vehicle 102 can include one or more sensor systems 104. The sensor system(s) 104 can be, for example, one or more time-of-flight sensors, LiDAR sensors, RADAR sensors, SONAR sensors, image sensors, audio sensors, infrared sensors, location sensors, etc., or any combination thereof. Certain implementations described herein may be particularly well-suited for use with time-of-flight sensors, although other types of sensors also are contemplated. The sensor system(s) 104 may be disposed to capture sensor data associated with the environment. For example, the sensor data may be processed by a vehicle control system to identify and/or classify objects in the environment, e.g., trees, vehicles, pedestrians, buildings, road surfaces, signage, barriers, road marking, or the like and/or to navigate the vehicle 102 relative to such object(s).

As also illustrated in FIG. 1, the sensor system(s) 104 can include one or more processors 106 and memory 108 communicatively coupled to the processor(s) 106. The memory 108 can store processor-executable by the processor(s) 106 to cause the sensor system(s) 104 to perform functions that quantify glare and image data and/or correct the data to remove the impact of the glare, as detailed herein. The processor(s) 106 and/or the memory 108 may be physically integrated into the sensor system(s), e.g., as an SoC, FPGA, ASIC, or the like, or, in some implementations, the processor(s) 106 and/or the memory 108 may be available to, e.g., connected to receive signals from and/or send signals to, the sensor system(s) 104. As discussed above, the sensor system(s) 104 can determine the sensor data in various formats (e.g., a quadrature format, an intensity and depth format, and/or an unprojected format) using the processor(s) 106.

The sensor system(s) 104 can also include an emitter 110 and a receiver 112. In the example of FIG. 1, the sensor system(s) 104 may include a time-of-flight sensor, and the emitter 110 may be configured to emit a carrier (e.g., a signal) and the receiver 112 may be configured to receive, e.g., capture, a response carrier (e.g., a response signal). The response carrier may be the carrier reflected off a surface in the environment. The time-of-flight sensor may be configured to determine sensor data in a quadrature format based on the carrier and the response carrier. In some instances, the sensor can measure a phase shift between the carrier and the response carrier and/or perform numerical integration calculation to determine the sensor data in the quadrature format (e.g., determining one or more of a quadrature from the response signal). In some implementations, the sensor can also determine an intensity and depth format of the sensor data, which may also be referred to as an intensity image and a depth image, respectively. For example, using the quadrature data, the sensor system can determine depth values and intensity values for each of a plurality of pixels representing a sensed environment and generate the depth and intensity images based on such values.

Aspects of the emitter 110 and/or aspects of the receiver 112 may be configurable. For instance, a modulation frequency and/or an intensity of the carrier emitted by the emitter 110 can be altered. For example, the illumination intensity associated with a carrier emitted by the emitter 110 can be altered by adjusting the voltage and/or frequency input to the emitter 110. Moreover, an integration or exposure time of the receiver 114 may be altered, e.g., by controlling an amount of time over which the receiver 112 collects response carriers. Altering the illumination power and/or the integration time can tune the sensor system(s) 104. For example, higher intensity illumination and/or longer integration times can result in increased performance in relatively lower ambient light environments and/or when the response carrier is from farther away objects and/or objects having lower reflectivity. Lower intensity illumination and/or shorter integration times can result in increased performance in relatively higher ambient light environments and/or when the response carrier is from relatively closer objects and/or objects having higher reflectivity.

As also illustrated in FIG. 1, the sensor system(s) 104 may be configured to output generated data as sensor data 114. For examples, the sensor data 114 can include quadrature values, intensity and depth information, or the like. In the illustrated example, the sensor data 114 can include phase frames 116 and/or image frames 118. As noted above, the emitter 110 emits a carrier and the receiver 112 receives a response carrier. In examples, the carrier may be amplitude-modulated light and the response carrier will have a phase shift relative to the carrier. Upon receipt at the receiver 112, the response carrier includes a phase value. Such values may be included in the phase frames 116. In examples described herein, including below with reference to FIG. 2, the sensor system(s) 104 may compute intensity and/or depth values based at least in part on phase values of a plurality of phase frames, e.g., four phase frames 116.

The intensity and depth values calculated using the phase frames 116 can be embodied as the image frames 118. The image frames 118 can include a stream of serially-generated (e.g., at a predetermined interval) image frames. Generally, each of the image frames 118 may include the same type of data, e.g., data related to the intensity and depth for each of a plurality of pixels comprising the receiver of the sensor. Specifically, the image frames 118 can include a depth image and an intensity image generated by the sensor system(s) 104 and representative of a portion of the environment 100. Similarly, other instances of the image frames 118 can include both an intensity image and a depth image representative of the environment 100 at the corresponding sensing time.

As noted above, different attributes of the environment 100 can result in degraded sensor data quality. For instance, ambient light, e.g., sunlight, may have the same or a similar wavelength as illumination light emitted and thus, can be perceived at pixels of the time-of-flight sensor as returns, despite not corresponding to emitted light. In high ambient light conditions, sunlight, in combination with light emitted by the emitter 110 can result in oversaturation of pixels. Moreover, highly reflective objects and/or objects that are extremely close to the sensor can result in stray light and/or glare that can adversely impact pixel quality. In addition, time-of-flight sensors may have a relatively short dynamic range, e.g., on the order of only a few meters, and returns off objects outside that dynamic range can be relatively weak, and thus provide inaccurate depth and/or unreliable, and generally low, intensity measurements. Techniques described herein can use the phase frames 116 and/or the image frames 118 to determine settings associated with the emitter 110 and/or the receiver 112, e.g., to reduce the impact of environmental factors, including those just described, on pixel quality. Controlling aspects of the emitter 110 and/or the receiver 112 can provide improved dataset that may better represent the environment and/or may have a higher associated confidence.

As illustrated in FIG. 1, a sensor control system 120 may be configured to receive the sensor data 114 generated by the sensor system(s) 104. In more detail, the sensor control system 120 can include a pixel evaluation component 122 and/or a power determination component 124. For clarity, the sensor control system 120 (and its components) are illustrated separate from the sensor system(s) 104. However, portions of the sensor control system 120 may be implemented on the sensor system(s) 104. By way of non-limiting example, the processor(s) 106 may be configured to execute actions associated with the pixel evaluation component 122 and/or the power determination component 124.

The pixel evaluation component 122 may be configured to determine reliability of data associated with individual pixels, e.g., to determine whether data associated with a pixel is "good" or "bad," reliable or unreliable, or otherwise. In at least one example, the pixel evaluation component 122 can determine unreliable pixels based on the phase frames 116. As noted above, the phase frames 116 can include phase values associated with the response carrier. The response carrier is expected to have properties or characteristics based on the shape of the carrier. In one example, the phase values associated with four phase frames should add to zero. Moreover, for four consecutively captured phase frames, the sum of (i) the difference between the third and the first phase values and (ii) the difference between the fourth and the second phase values should also equal zero. When the phase values for individual pixels do not conform to these properties, the pixel evaluation component 122 can identify the pixel as unreliable. The pixel evaluation component 122 can also look to the image frames 118 to determine whether pixels are reliable or not. For instance, saturated pixels (e.g., having an intensity of 1—or otherwise corresponds to a maximum value of the sensor) may be identified as unreliable.

In some examples, the pixel evaluation component 122 can also determine a quantity of bad or unreliable pixels. As will be appreciated, time-of-flight sensors can generate images comprising an array of thousands of pixels. After making a binary, e.g., good/bad, determination for each pixel, the pixel evaluation component 122 can quantify a number of bad pixels and/or a ratio of bad pixels to good pixels. As described further herein, this number or ratio may be used to determine whether aspects of the emitter 110 and/or the receiver 112 should be adjusted. By way of example and not limitation, when the number or ratio exceeds a threshold number or ratio (e.g., 1/1, 2/1, or the like), aspects of the emitter 110 and/or the receiver 112 may be adjusted to reduce the number/ratio.

In addition to identifying and quantifying poor-quality pixels, the pixel evaluation component 122 can also determine additional information associated with the pixels, e.g., to characterize or identify the source of the inferior quality. By way of non-limiting example, the pixel evaluation component 122 can determine information about an intensity of the pixels identified as unreliable. For example, the intensity for these pixels can be determined from the image frames 118 (e.g., from the intensity image). In some examples, the pixel evaluation component 122 can determine a distribution of the bad pixels and/or an average intensity for these pixels. In addition to determining attributes associated with the intensity of poor-quality pixels, the pixel evaluation component 122 can also determine attributes associated with the intensity of all pixels in the sensor data 114 (e.g., good and bad pixels). For example, the pixel evaluation component 122 may receive, generate, or otherwise access an intensity histogram to determine these attributes.

The power determination component 124 can receive the information generated by the pixel evaluation component 122, e.g., the number/ratio of bad pixels, intensity attributes of those pixels, and/or intensity attributes of all pixels, and determine whether to adjust settings of the sensor system(s) 104. By way of non-limiting example, the power determination component 124 can determine whether to increase power or decrease power at the sensor system(s). As used herein, controlling the power of the sensor system(s) 104 may be done in a number of way. For example, power may be increased by one or both of controlling the emitter 110 to increase an illumination intensity and/or controlling the receiver 112 to increase an integration (or exposure) time. Conversely, power may be decreased by one or both of controlling the emitter to decrease an illumination intensity and/or controlling the receiver 112 to decrease the integration (or exposure) time.

In at least some examples, the power determination component 124 can determine a saturation value or score from information about the unreliable pixels, and implement or instruct a power adjustment based on the saturation value. For example, when the saturation value for the image is above a threshold, the power may be decreased. In some examples, when the saturation value is below a threshold, the power may be increased, as detailed further herein. In some examples, the saturation value can be calculated using Equation (1):

$$S = 0.05 \times P_{unreliable} + 10 \log(P_{unreliable} \times E_{unreliable} + 0.01) + 0\ 0.01 \times P_{high\ energy} \qquad (1)$$

In the equation, S represents the saturation value, $P_{unreliable}$ is a number or ratio of unreliable pixels, e.g., determined by the pixel evaluation component 122, $E_{unreliable}$ is an energy of the unreliable pixels, and $P_{high\ energy}$ is a number of pixels having an energy above a threshold energy. In at least one example, $P_{high\ energy}$ may represent a number of pixels in an upper half of an intensity histogram associated with the image. As will be appreciated, the coefficients can vary dependent upon the application and/or desired outcome. In use, as discussed above, the saturation value may be used to determine whether, and how much, to alter power of the sensor. In examples, the saturation value can be calculated as part of a power control loop, e.g., for each image frame, and the power can be controlled to obtain a desired saturation value.

As illustrated, Equation (1) uses each of the number or ratio of bad pixels, intensity of the bad pixels, and intensity distribution for high energy pixels as factors for determining the saturation value. In other examples, the power determination component 124 can use other and/or additional factors. For instance, and as described above, additional attributes of the intensity of the image (e.g., including all pixels) may also be considered. In at least one example, when an overall intensity or average intensity meets or exceeds a first, e.g., relatively high(er), threshold intensity, it may be determined that the poor quality of several of the pixels is due to over-exposure or saturation. Accordingly, the power determination component 124 can determine to decrease power at the sensor system(s) 104. Similarly, when the overall intensity or average intensity is equal to less than a second, e.g., relatively low(er), intensity threshold, it may be assumed that the inferior quality of several of the pixels is due to under-exposure. Accordingly, the power determination component 124 can determine to increase power at the sensor system(s) 104.

The power determination system 124 can also generate one or more power control signals 126, e.g., to control aspects of the sensor system(s) 104 to implement the determined change in power. For example, the power control signal(s) 126 can instruct a change in voltage and/or current supplied to the emitter 110, can instruct the receiver 112 to alter an integration time, and/or the like. As also illustrated in FIG. 1, the sensor control system 120 can output the power control signal(s) 126 to the sensor system(s) 104, e.g., to the emitter 110 and/or the receiver 112. The sensor system(s) 104 may then generate a next iteration of the sensor data 114 with the sensor system(s) 104 reconfigured according to the power control signal(s) 126. As will be appreciated, dynamically changing the power in accordance with techniques described herein can reduce the number of bad pixels in subsequent frames. In one example, by dynamically lowering power at a time-of-flight sensor, frames that would be substantially completely saturated, e.g., because of highly reflective and/or close objects, can be improved to reduce saturation, thereby allowing for better recognition of objects. This may be particularly useful in configurations in which the time-of-flight sensor is relied upon to sense objects in close proximity to a vehicle.

Figure 2:
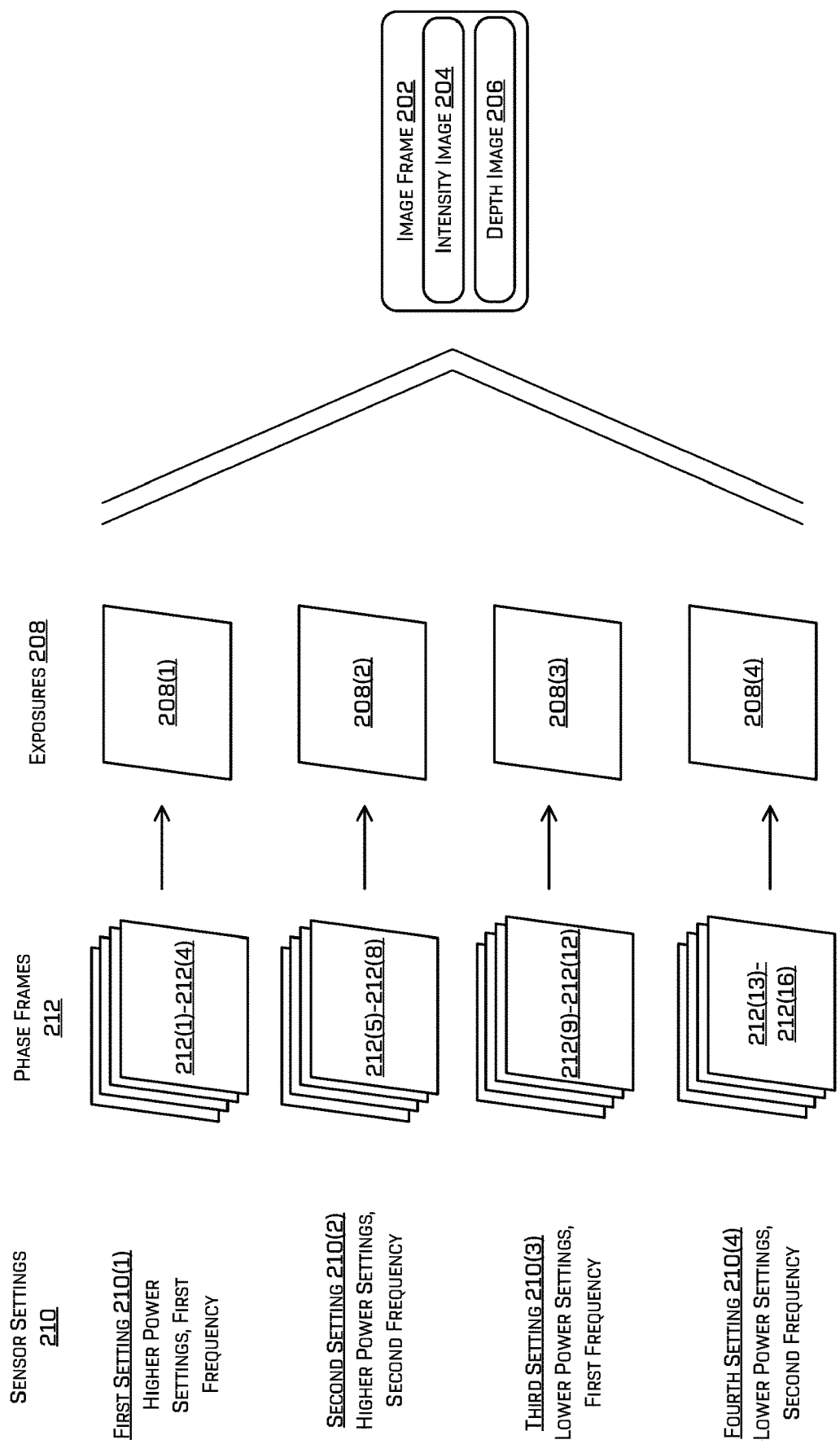
FIG. 2 is a schematic diagram illustrating sensor data generation at a sensor, such as a time-of-flight sensor, as described herein.

FIG. 2 is a schematic diagram illustrating aspects of a sensor system, such as the sensor system(s) 104 described above. More specifically, the diagram illustrates aspects of data capture conceptualizing how an image frame 202 may be generated by the sensor. In this example, the image frame 202 may include an intensity image 204 and a depth image 206. The intensity image 204 can include per-pixel intensity values and the depth image 206 can include per-pixel depth values. Although illustrated as including only the intensity image 204 and the depth image 206, the image frame 202 can include additional information, including but not limited to reflectivity information and/or confidence information. The illustrated image frame 202 may be a single iteration of information (e.g., depth and intensity) corresponding to a sensed environment at a point in time. The image frame may be generated and/or output by the sensor at a predetermined interval, e.g., 10 Hz.

As illustrated, the image frame 202 can be generated from one or more exposures 208. In the illustration, the exposures 208 include a first exposure 208(1), a second exposure 208(2), a third exposure 208(3), and a fourth exposure 208(4). Although four exposures are illustrated, more or fewer (including only a single exposure) may be used in examples described herein. Generally, each of exposures 208 may correspond to different sensor settings 210, and the multiple exposures 208 can be combined or otherwise blended to provide the image frame 202. In FIG. 2, the sensor settings 210 include a first setting 210(1) having a relatively higher power setting (e.g., a higher illumination power or intensity and/or a longer integration time) and a first modulation frequency; a second setting 210(2) having the same power as the first setting 210(1) and a second modulation frequency; a third setting 210(3) having a relatively lower power setting (e.g., a lower illumination power/intensity and/or a shorter integration time) and the first modulation frequency; and a fourth setting 210(4) having the same power as the third setting 210(3) and the second modulation frequency. Of course, these are example settings only. Additional details about and techniques associated with generating an image frame from multiple exposures are disclosed in U.S. application Ser. No. 16/198,208, filed Nov. 21, 2018, and titled "Intensity and Depth Measurements in Time-of-Flight Sensors," the entire disclosure of which application is hereby incorporated by reference. As detailed therein, a resolved frame, which may correspond to the image frame 202, may include blended intensity determined using multiple exposures (or frames of data) at different integration times and/or different illumination intensities and/or may include disambiguated depths determined using multiple frames of data determined at different modulation frequencies. In examples, to output the image frame 202 at a frequency of 10 Hz, each of the exposures 208 may be generated at a frequency of 40 Hz in some examples.

As also illustrated in FIG. 2, each of the exposures 208 may be based at least in part on a plurality of phase frames 212. More specifically, the phase frames 212 may include the raw data, e.g., a phase value of the return carrier, received at the sensor. In the example, each of the exposures 208 may be based on four phase frames. In the example, the first exposure 208(1) is generated from the phase frames 212(1)-212(4), the second exposure 208(2) is generated from the phase frames 212(5)-212(8), the third exposure 208(3) is generated from the phase frames 212(9)-212(12), and the fourth exposure 208(4) is generated from the phase frames 212(13)-212(16). In examples, the phase frames 212 are used to model the return carrier and a correlation function may be generated based on the carrier and the model. The four values associated with phase frames are four points on the correlation function. The phase values from the phase frames 212 can be used in example implementations to determine whether to adjust one or more sensor settings, e.g., to adjust one or more of the sensor settings 210. Moreover, although FIG. 2 illustrates that each of the exposures 208 is generated from four of the phase frames 212, more or fewer (e.g., as few as two) phase frames 212 may be used in implementations. In the example provided above in which the exposures 208 are generated at a frequency of 40 Hz, the phase frames 212 can be generated at a frequency of 160 Hz in some examples.

Figure 3:
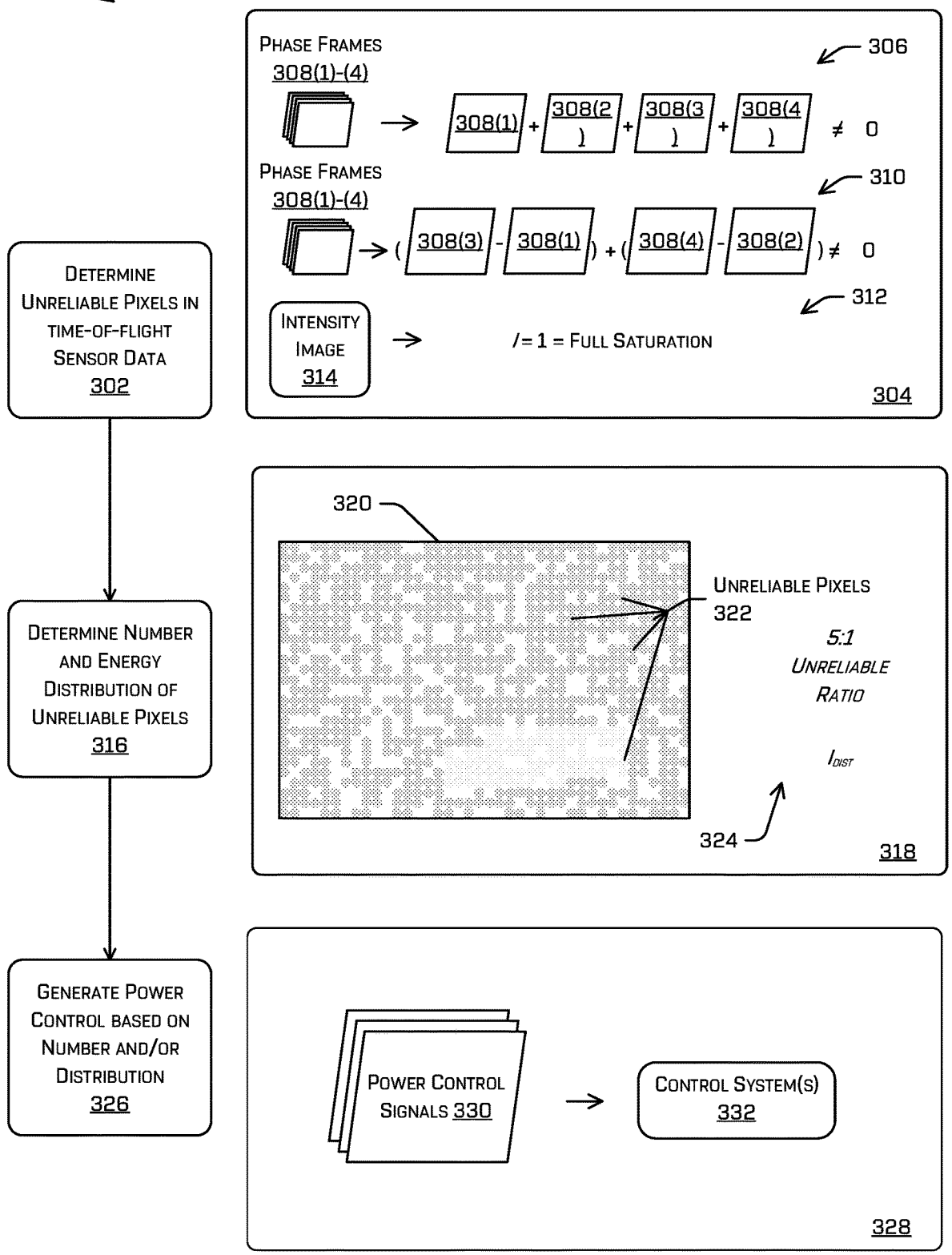
FIG. 3 includes textual and pictorial flowcharts of an example method for active power control of a sensor, such as a time-of-flight sensor, as described herein.

FIG. 3 includes textual and graphical flowcharts illustrative of a process 300 for controlling attributes of a sensor, according to implementations of this disclosure. For example, the process 300 can be implemented using components and systems illustrated in FIG. 1 and described above, although the process 300 is not limited to being performed by such components and systems. Moreover, the components and systems of FIG. 1 are not limited to performing the process 300.

In more detail, the process 300 can include an operation 302 that includes determining unreliable pixels in time-of-flight sensor data. As noted above, techniques described herein may be particularly applicable to use with time-of-flight sensors, and the example of FIG. 3 uses time-of-flight sensors as one specific example. The disclosure is not limited to use with time-of-flight sensors, as techniques described herein may be applicable to other types of sensors that may be adversely affected by poor pixel quality, e.g., resulting from environmental conditions such as those described herein. In some examples, the operation 302 can first include receiving raw data and/or depth and intensity data measured by the time-of-flight sensor.

An example 304 accompanying the operation 302 graphically illustrates a number of techniques that may be used to identify unreliable pixels. A first technique 306 includes determining reliability of a pixel, e.g., whether a pixel is of good or poor quality, using four phase frames 308(1)-308(4), e.g., a first phase frame 308(1), a second phase frame 308(2), a third phase frame 308(3), and a fourth phase frame 308(4).

As will be appreciated, each of the phase frames 308(1)-208(4) can include a phase value for each pixel of the sensor. In the example, the phase frames 308(1)-308(4) are captured serially, e.g., at a fixed interval. The phase frames 308(1)-308(4) may correspond to the phase frames 212, and more particularly to a group of the four phase frames 212 (e.g., phase frames 212(1)-212(4), 212(5)-212(8), and so forth) corresponding to one of the exposures 208. As illustrated, the first technique 306 comprises determining whether phase values associated with the phase frames 308(1)-308(4) comport with a specific characterization. Specifically, the first technique 306 comprises adding, for a pixel, phase values from the four phase frames to determine whether the sum equals zero (or a value that is substantially zero. As stated above, the return carrier is expected to have the same shape as the carrier, e.g., sinusoid or the like, and a sampling of four equally spaced points on the return carrier should equal zero. As shown in the example 304, if the sum of the phase values associated with the phase frames 308(1)-308(4) does not equal zero, the operation 302 determines that the pixel is unreliable, of inferior quality, or otherwise bad. As will be understood, "zero" herein can include any value that is substantially zero, which may be a value that is within a tolerance or margin of error of zero, which may be 5%, 10% or more.

A second technique 310 also includes determining whether the values associated with the phase frames 308(1)-308(4) comport with a characterization. Specifically, the second technique 310 can include determining whether the sum of (i) the difference between the value associated with the third phase frame 308(3) and the value associated with the first phase frame 308(1) and (ii) the difference between the value associated with the fourth phase frame 308(4) and the value associated with the second phase frame 308(2). As illustrated, if this difference does not equal zero (or substantially zero), the second technique 310 can determine that the pixel is an unreliable pixel.

A third technique 312 for determining reliability of a pixel may use an intensity image 314, which may correspond to the intensity image 204. The intensity image 314 can include an intensity value for each pixel. In the third technique 312, the operation 302 can include identifying any pixels that are fully saturated. For instance, pixels with an intensity value of 1 (or other maximum according to the sensor) may be flagged as unreliable by the third technique, regardless of whether the phase values from which the intensity was derived are not identified by the first technique 306 and/or the second technique 310. The first technique 306, the second technique 310, and the third technique 312 are examples only; other techniques for determining unreliable pixels may also be used. Regardless of the technique(s) used, the operation 302 can identify pixels that are unreliable.

At an operation 316, the process 300 can include determining a number and/or energy distribution of the unreliable pixels. For example, the operation 316 can quantify the unreliable pixels as a number of unreliable pixels and/or a ratio of unreliable pixels to reliable pixels. An example 318 accompanying the operation 316 includes a visualization 320 of an image frame corresponding to the time-of-flight sensor data considered at the operation 302. In the visualization 320, higher intensity pixels are generally lighter whereas lower intensity pixels are generally darker. For example, intensity may be measured from 0 (lowest) to 1 (highest), such that an intensity of 0 would be indicated in the visualization 320 as black and an intensity of 1 would be indicated in the visualization 320 as white. The visualization 320 graphically depicts a number of pixels 322 that were determined to be unreliable by the operation 302. In the visualization 320, those pixels that were not determined unreliable (e.g., reliable, valid, or good pixels) are not shown. (For clarity, although the unreliable pixels 322 could have complete saturation (e.g., an intensity of 1), the "white" areas of the visualization 320 are intended to represent reliable pixels. The example 318 also includes additional information 324, which may include a ratio of unreliable pixels to reliable pixels and an intensity or energy distribution for the unreliable pixels. In the illustrated example, the unreliable pixels outnumber the reliable pixels 5:1, indicating that much of the image data is invalid. Accordingly, gleaning meaningful information from the data, e.g., detecting objects in the data, may be difficult, if possible. The intensity distribution included in the additional information 324 may indicate that the unreliable pixels have, generally, very high energy. The unreliable ratio and/or the intensity distribution in the additional information 324 are for example only.

At an operation 326, the process 300 can include generating a power control based on the number and/or distribution of pixels. An example 328 accompanying the operation 326 illustrates power control signal(s) 330 being transmitted to one or more control systems 332. In this example, the power control signal(s) 330 can be embodied as controls or instructions to an emitter of the sensor and/or a receiver of the sensor. For example, the power control signal(s) 330 can include an instruction to increase or decrease an illumination intensity of the carrier emitted by the emitter, e.g., by increasing or decreasing the current and/or voltage applied to the emitter. Also in examples, the power control signal(s) 330 can include an instruction to increase or decrease an integration time, e.g., a time over which the receiver receives response carriers. Using the example shown in the visualization 320, the operation 326 may include determining that the unreliable pixel ratio is equal to or above a threshold ratio, e.g., equal to or above 3:1, 4:1, or the like, and that the intensity distribution is equal to or above a threshold intensity. Based on these determinations, the operation 326 may determine that the power should be decreased, e.g., because the intensities are relatively high, and that better results may be obtained by lowering power. In this example, the operation 326 can include generating the power control signal(s) 330 that cause the control system(s) 332 to change the power at the sensor. In another example, if the intensity distribution indicated that the pixels were generally low intensity, the operation 326 could include generating the power control signal(s) 330 as signals that will cause the control system(s) 332 to increase the power, e.g., to increase the illumination and/or configure the pixels to receive response carriers over a longer period of time.

In the example of FIG. 3, the unreliable ratio may be a first indicator that the power should be changed, and the intensity distribution may be a confirming indicator that the power should be changed and/or provide a basis for an amount to change the power. In other examples, the operation 326 may also or alternatively consider additional information when making a power-change determination. For instance, intensity information (e.g., from the intensity image 314) for all pixels can be used to determine whether (and/or how much) the power should be changed. The intensity information may be determined from a histogram associated with the intensity image 314.

Figure 4:
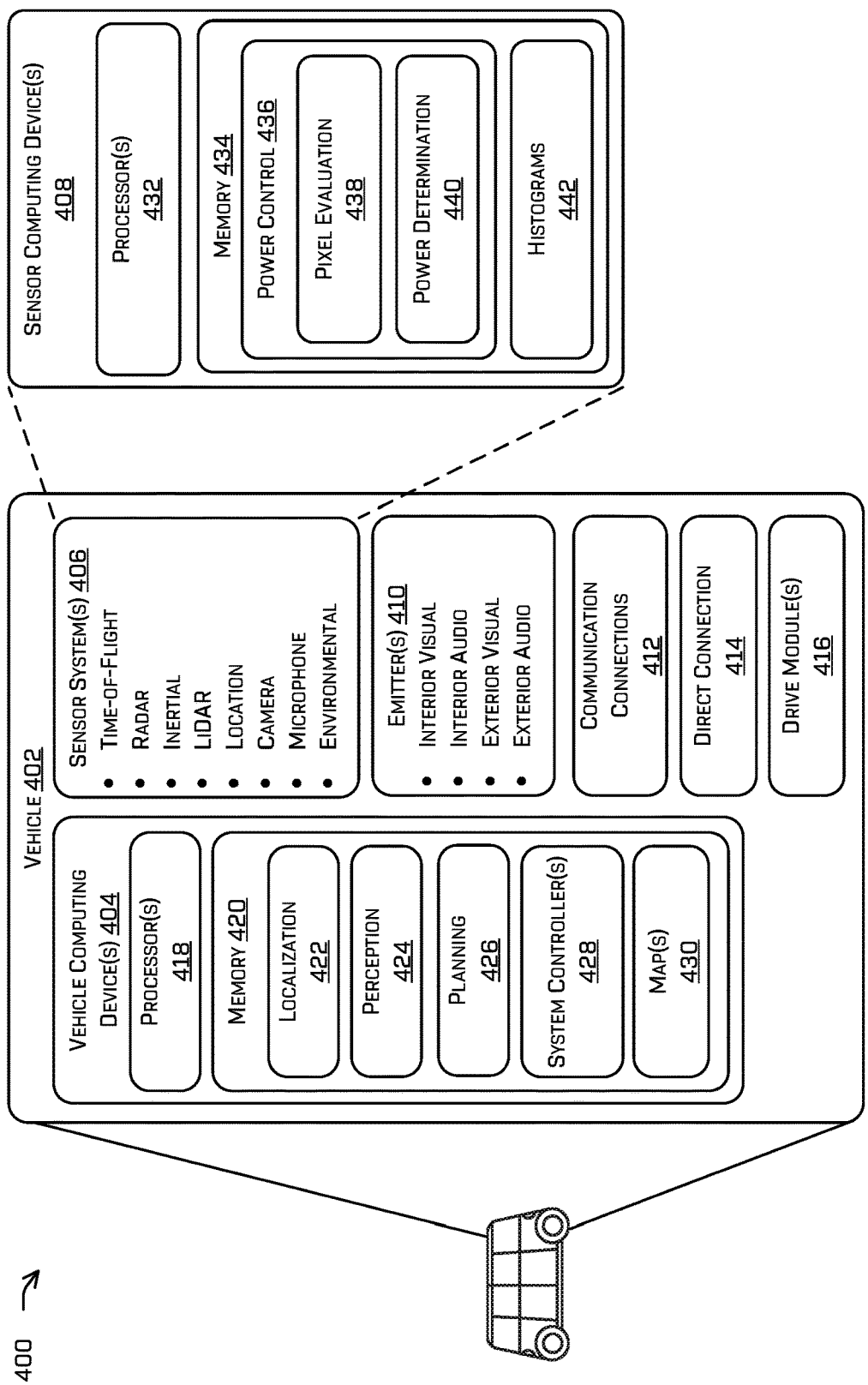
FIG. 4 depicts a block diagram of an example computing system for dynamic power control of a sensor, such as a time-of-flight sensor, as described herein.

FIG. 4 depicts a block diagram of an example system 400 for implementing the techniques discussed herein. In at least one example, the system 400 can include a vehicle 402, which can be similar to (or the same as) the vehicle 102 described above with reference to FIG. 1. In the illustrated example 400, the vehicle 402 is an autonomous vehicle; however, the vehicle 402 can be any other type of vehicle.

The vehicle 402 can include one or more vehicle computing devices 404, one or more sensor systems 406, which may include one or more sensor computing devices 408, one or more emitter(s) 410, one or more communication connections 412, at least one direct connection 414 (e.g., for physically coupling with the vehicle 402 to exchange data and/or to provide power), and one or more drive modules 416. In some instances, the vehicle 402 can include more or fewer instances of the vehicle computing device(s) 404. The sensor system(s) 406 can be configured to capture sensor data associated with an environment. In examples, the sensor system(s) 406 can include the sensor system(s) 104 and/or the time-of-flight sensor(s) 208.

The vehicle computing device(s) 404 can include one or more processors 418 and memory 420 communicatively coupled with the one or more processors 418. In at least one instance, the processor(s) 418 can be similar to the processor(s) 106 and the memory 420 can be similar to the memory 108 described above with reference to FIG. 1. In the illustrated example, the memory 420 of the vehicle computing device(s) 404 stores a localization component 422, a perception component 424, a planning component 426, one or more system controllers 428, and one or more maps 430. Though depicted as residing in the memory 420 for illustrative purposes, it is contemplated that the localization component 422, the perception component 424, the planning component 426, and/or the system controller(s) 428 can additionally, or alternatively, be accessible to the vehicle computing device(s) 404 (e.g., stored in a different component of vehicle 402 and/or stored remotely).

In at least one example, the localization component 422 can include functionality to receive data from the sensor system(s) 406 to determine a position of the vehicle 402. In examples, received data can include a depth image and/or an intensity image. In other implementations, the localization component 422 can include and/or request/receive a three-dimensional map, e.g., of the map(s) 430 of an environment and can continuously determine a location of the autonomous vehicle within the map. In some instances, the localization component 422 can use SLAM (simultaneous localization and mapping) or CLAMS (calibration, localization and mapping, simultaneously) to receive image data, such as from the time-of-flight sensor, LiDAR data, RADAR data, SONAR data, IMU data, GPS data, wheel encoder data, or any combination thereof, and the like to accurately determine a location of the autonomous vehicle 402. In some instances, the localization component 422 can provide data to various components of the vehicle 402 to determine an initial position of an autonomous vehicle for generating a candidate trajectory, as discussed herein.

In some examples, the perception component 424 can include functionality to perform object detection, segmentation, and/or classification. In some examples, the perception component 424 can receive data and generate processed sensor data that indicates a presence of an object in the environment of, e.g., proximate, the vehicle 402 and/or a classification of the object as an object type (e.g., car, pedestrian, cyclist, building, tree, road surface, curb, sidewalk, unknown, etc.). In additional and/or alternative examples, the perception component 424 can provide processed sensor data that indicates one or more characteristics associated with a detected object and/or the environment in which the object is positioned. In some examples, characteristics associated with an object can include, but are not limited to, an x-position (global position), a y-position (global position), a z-position (global position), an orientation, an object type (e.g., a classification), a velocity of the object, an extent of the object (size), or the like. Characteristics associated with the environment can include, but are not limited to, a presence of another object in the environment, a state of another object in the environment, a time of day, a day of a week, a season, a weather condition, an indication of darkness/light, etc.

In some instances, the planning component 426 can determine a path for the vehicle 402 to follow to traverse through an environment. For example, the planning component 426 can determine various routes and trajectories and various levels of detail. In some examples, the planning component 426 can determine a route to travel from a first location (e.g., a current location) to a second location (e.g., a target location). For the purpose of this discussion, a route can be a sequence of waypoints for traveling between two locations. As non-limiting examples, waypoints include streets, intersections, global positioning system (GPS) coordinates, etc. Further, the planning component 426 can generate an instruction for guiding the autonomous vehicle along at least a portion of the route from the first location to the second location. In at least one example, the planning component 426 can determine how to guide the autonomous vehicle from a first waypoint in the sequence of waypoints to a second waypoint in the sequence of waypoints. In some examples, the instruction can be a trajectory, or a portion of a trajectory. In some instances, multiple trajectories can be substantially simultaneously generated (i.e., within technical tolerances) in accordance with a receding horizon technique. A single trajectory of the multiple trajectories in a receding horizon having the highest confidence level may be selected to operate the vehicle.

In other examples, the planning component 426 can alternatively, or additionally, use data from the perception component 424 to determine a path for the vehicle 402 to follow to traverse through an environment. For example, the planning component 426 can receive data from the perception component 424 regarding objects associated with an environment. Using this data, the planning component 426 can determine a route to travel from a first location (e.g., a current location) to a second location (e.g., a target location) to avoid objects in an environment.

As noted above, the vehicle computing device(s) 404 can include the system controller(s) 428, which can be configured to control steering, propulsion, braking, safety systems, emitters, communication systems, and/or other systems of the vehicle 402. The system controller(s) 428 can communicate with and/or control corresponding systems of the drive module(s) 416 and/or other components of the vehicle 402, which may be configured to operate in accordance with a trajectory provided from the planning component 426.

In some examples, the map(s) 430 can be stored on a remote computing device. Multiple maps 430 can be stored based on, for example, a characteristic (e.g., type of entity, time of day, day of week, season of the year, etc.). Storing multiple maps 430 can have similar memory requirements, but increase the speed at which data in a map can be accessed.

In at least one example, the sensor system(s) 406 can be similar to the sensor system(s) 104 described above with reference to FIG. 1. The sensor system(s) 406 can include time-of-flight sensors, location sensors (e.g., GPS, compass, etc.), inertial sensors (e.g., inertial measurement units (IMUs), accelerometers, magnetometers, gyroscopes, etc.), LIDAR sensors, RADAR sensors, SONAR sensors, infrared sensors, cameras (e.g., RGB, IR, intensity, depth, etc.), microphone sensors, environmental sensors (e.g., temperature sensors, humidity sensors, light sensors, pressure sensors, etc.), ultrasonic transducers, wheel encoders, etc. The sensor system(s) 406 can include multiple instances of each of these or other types of sensors. For instance, the time-of-flight sensors can include individual time-of-flight sensors located at the corners, front, back, sides, and/or top of the vehicle 402. As another example, the camera sensors can include multiple cameras disposed at various locations about the exterior and/or interior of the vehicle 402. The sensor system(s) 406 can provide input to the vehicle computing device(s) 404.

The sensor system(s) 406 can include the sensor computing device(s) 408, which can include one or more processors 432 and memory 434 communicatively coupled with the one or more processors 432. The one or more processors 432 can be similar to the processor(s) 106 and/or to the processor(s) 418, described above. The memory 434 can be similar to the memory 108 and/or to the memory 420, described above. In the illustrated example, the memory 434 of the sensor computing device(s) 408 can store a power control system 436, which can include a pixel evaluation component 438 and a power determination component 440, and one or more histograms 442. Though depicted as residing in the memory 434 for illustrative purposes, it is contemplated that the power control system 436 (as well as its associated components) and/or the histograms 442 can additionally, or alternatively, be accessible to the sensor system(s) 406 (e.g., stored in a different component of vehicle 402 and/or stored remotely). Moreover, although the power control system 436 (as well as its associated components) and the histograms 442 are illustrated as being stored in and/or part of the sensor computing device(s) 408, in other implementations any or all of these components may be stored in the memory 420 and/or in some other, not illustrated memory, such as a remote memory associated with a remote computing device. That is, although FIG. 4 illustrates several components as being part of the sensor computing device(s) 408 of the sensor system(s) 406, the processing associated with any or all of those components may be performed other than at the sensor. In one example, the sensor system(s) 406 may output raw data, e.g., the quadrature data discussed above, for processing in accordance with functionality ascribed herein to one or more of the power control system 436, the pixel evaluation component 438, and/or the power determination component 440, but that processing may be performed other than at the location of the emitter and the receiver. Moreover, the histograms 442 may be generated (and stored) other than by the sensor computing device(s) 408. Without limitation, the sensor system(s) 406 can include on-board processing capabilities to perform any or all functionality described herein and associated with correcting glare on the sensor. Alternatively, processing of the sensor data may be processed to correct for glare other than at the sensor system(s) 406.

The sensor computing device(s) 408, including the power control system 436, may be configured to generate and/or process data in many formats. For example, and as noted above, the sensor computing device(s) 408 can measure a phase shift between the carrier and the response carrier and/or perform numerical integration calculations to determine the sensor data in the quadrature format. In other examples, the sensor computing device(s) 408 can determine an intensity and depth format of the sensor data, e.g., generate the depth and intensity images. For purposes of illustration only, the sensor system(s) 406 can determine the sensor data in the intensity and depth format where an individual pixel in the sensor data is associated with an 8-bit value for the intensity and a 12-bit value for the depth.

The power control system 436 can be configured to receive sensor data generated by the sensor system(s) 406, e.g., by a time-of-flight senor, and generate controls to alter aspects of the sensor system(s) 406, e.g., to improve subsequent returns. In examples described herein, adjusting power, e.g., illumination intensity and/or integration time, can result in better, e.g., more reliable, sensor data. For example, and as detailed herein, data generated by time-of-flight sensors can include noise, especially from stray light caused by a number of factors. Reducing the number of unreliable pixels can provide down-stream systems with improved data. In examples described herein, pixel noise can be particularly problematic in implementations in which a distance to objects in the environment is required, e.g., to safely travel through an environment relative to such objects.

The pixel evaluation component 438 can determine attributes of pixels in image data, e.g., on a per-pixel basis. The pixel evaluation component 438 can correspond to the pixel evaluation component 122 detailed above. For example, the pixel evaluation component 438 can make a binary decision that determines whether a pixel is reliable or unreliable, e.g., good or bad. As described in connection with FIG. 3, the pixel evaluation component 438 may make this determination using any of a number of techniques, including based on intensity information and/or phase value information.

The power determination component 440 can determine a power change based on the pixel evaluations. The power determination component 440 can correspond to the power determination component 124 detailed further herein. For example, the power determination component 440 can determine a power change for the sensor based at least in part on the number of unreliable pixels, e.g., the number of unreliable pixels exceeding a threshold number, and/or based at least in part on intensity information about the pixels, e.g., from intensity images. As described further herein, the power determination component 440 may determine the power based at least in part on intensity of the unreliable pixels and/or the intensity of all pixels in the image data. Other details of the power determination component 440 are described herein.

The sensor computing device(s) 408 may also include functionality to generate the histograms 442. For instance, the histograms 442 may include, for each instance of image data, distributions of the depths and/or intensity values in the image data. As detailed further herein, the histograms 442 may be used, e.g., by the power determination component 440, to understand intensities of pixels in the image to inform a power change.

The emitter(s) 410 are configured for emitting light and/or sound, as described above. In the illustrated example, the emitter(s) 410 can include interior visual and/or interior audio emitters to communicate with passengers of the vehicle 402. By way of example and not limitation, interior emitters can include speakers, lights, signs, display screens, touch screens, haptic emitters (e.g., vibration and/or force feedback), mechanical actuators (e.g., seatbelt tensioners, seat positioners, headrest positioners, etc.), and the like. The emitter(s) 410 in this example also include exterior emitters, which may be exterior visual and/or exterior audio emitters. By way of example and not limitation, the exterior emitters in this example can include lights to signal a direction of travel or other indicator of vehicle action (e.g., indicator lights, signs, light arrays, etc.) and one or more audio emitters (e.g., speakers, speaker arrays, horns, etc.) to audibly communicate with pedestrians or other nearby vehicles, one or more of which may comprise acoustic beam steering technology.

The communication connection(s) 412 enable communication between the vehicle 402 and one or more other local or remote computing device(s), including the sensor computing device(s) 408. For instance, the communication connection(s) 412 can facilitate communication with other local computing device(s) on the vehicle 402 and/or the drive module(s) 416. Also, the communication connection(s) 412 can allow the vehicle to communicate with other nearby computing device(s) (e.g., other nearby vehicles, traffic signals, etc.). The communications connection(s) 412 can also enable the vehicle 402 to communicate with a remote teleoperations computing device or other remote services.

The communications connection(s) 412 can include physical and/or logical interfaces for connecting the vehicle computing device(s) 404 to another computing device or an external network (e.g., the Internet). For example, the communications connection(s) 412 can enable Wi-Fi-based communication such as via frequencies defined by the IEEE 802.11 standards, short range wireless frequencies such as Bluetooth, cellular communication (e.g., 2G, 4G, 4G, 4G LTE, 5G, etc.) or any suitable wired or wireless communications protocol that enables the respective computing device to interface with the other computing device(s).

In some examples, the drive module(s) 416 can include a single drive module 416. In other examples, the vehicle 402 can have multiple drive modules, and individual drive modules 416 can be positioned on opposite ends of the vehicle 402 (e.g., the front and the rear, etc.). In at least one example, the drive module(s) 416 can include one or more sensor systems to detect conditions of the drive module(s) 416 and/or the surroundings of the vehicle 402. By way of example and not limitation, the sensor system(s) can include one or more wheel encoders (e.g., rotary encoders) to sense rotation of the wheels of the drive modules, inertial sensors (e.g., inertial measurement units, accelerometers, gyroscopes, magnetometers, etc.) to measure orientation and acceleration of the drive module, cameras or other image sensors, ultrasonic sensors to acoustically detect objects in the surroundings of the drive module, LiDAR sensors, RADAR sensors, etc. Some sensors, such as the wheel encoders can be unique to the drive module(s) 416. In some cases, the sensor system(s) on the drive module(s) 416 can overlap or supplement corresponding systems of the vehicle 402 (e.g., the sensor system(s) 406).

The drive module(s) 416 can include many of the vehicle systems, including a high voltage battery, a motor to propel the vehicle, an inverter to convert direct current from the battery into alternating current for use by other vehicle systems, a steering system including a steering motor and steering rack (which can be electric), a braking system including hydraulic or electric actuators, a suspension system including hydraulic and/or pneumatic components, a stability control system for distributing brake forces to mitigate loss of traction and maintain control, an HVAC system, lighting (e.g., lighting such as head/tail lights to illuminate an exterior surrounding of the vehicle), and one or more other systems (e.g., cooling system, safety systems, onboard charging system, other electrical components such as a DC/DC converter, a high voltage junction, a high voltage cable, charging system, charge port, etc.). Additionally, the drive module(s) 416 can include a drive module controller which can receive and preprocess data from the sensor system(s) and to control operation of the various vehicle systems. In some examples, the drive module controller can include one or more processors and memory communicatively coupled with the one or more processors. The memory can store one or more modules to perform various functionalities of the drive module(s) 416. Furthermore, the drive module(s) 416 also include one or more communication connection(s) that enable communication by the respective drive module with one or more other local or remote computing device(s).

The processor(s) 418 of the vehicle 402, the processor(s) 432 of the sensor computing device(s) 408, and/or the processor(s) 106 of the sensor system(s) 104 can be any suitable processor capable of executing instructions to process data and perform operations as described herein. By way of example and not limitation, the processor(s) 418, 432, 106 can comprise one or more Central Processing Units (CPUs), Graphics Processing Units (GPUs), or any other device or portion of a device that processes electronic data to transform that electronic data into other electronic data that can be stored in registers and/or memory. In some examples, integrated circuits (e.g., ASICs, etc.), gate arrays (e.g., FPGAs, etc.), and other hardware devices can also be considered processors in so far as they are configured to implement encoded instructions.

The memory 420, 434, 108 are examples of non-transitory computer-readable media. The memory 420, 434, 108 can store an operating system and one or more software applications, instructions, programs, and/or data to implement the methods described herein and the functions attributed to the various systems. In various implementations, the memory 420, 434, 108 can be implemented using any suitable memory technology, such as static random-access memory (SRAM), synchronous dynamic RAM (SDRAM), nonvolatile/Flash-type memory, or any other type of memory capable of storing information. The architectures, systems, and individual elements described herein can include many other logical, programmatic, and physical components, of which those shown in the accompanying figures are merely examples that are related to the discussion herein.

In some instances, aspects of some or all of the components discussed herein can include any models, algorithms, and/or machine learning algorithms. For example, in some instances, the components in the memory 420, 434, 108 can be implemented as a neural network.

As described herein, an exemplary neural network is a biologically inspired algorithm which passes input data through a series of connected layers to produce an output. Each layer in a neural network can also comprise another neural network, or can comprise any number of layers (whether convolutional or not). As can be understood in the context of this disclosure, a neural network can use machine learning, which can refer to a broad class of such algorithms in which an output is generated based on learned parameters.

Although discussed in the context of neural networks, any type of machine learning can be used consistent with this disclosure. For example, machine learning algorithms can include, but are not limited to, regression algorithms (e.g., ordinary least squares regression (OLSR), linear regression, logistic regression, stepwise regression, multivariate adaptive regression splines (MARS), locally estimated scatterplot smoothing (LOESS)), instance-based algorithms (e.g., ridge regression, least absolute shrinkage and selection operator (LASSO), elastic net, least-angle regression (LARS)), decisions tree algorithms (e.g., classification and regression tree (CART), iterative dichotomiser 3 (ID3), Chi-squared automatic interaction detection (CHAID), decision stump, conditional decision trees), Bayesian algorithms (e.g., naïve Bayes, Gaussian naïve Bayes, multinomial naïve Bayes, average one-dependence estimators (AODE), Bayesian belief network (BNN), Bayesian networks), clustering algorithms (e.g., k-means, k-medians, expectation maximization (EM), hierarchical clustering), association rule learning algorithms (e.g., perceptron, back-propagation, hopfield network, Radial Basis Function Network (RBFN)), deep learning algorithms (e.g., Deep Boltzmann Machine (DBM), Deep Belief Networks (DBN), Convolutional Neural Network (CNN), Stacked Auto-Encoders), Dimensionality Reduction Algorithms (e.g., Principal Component Analysis (PCA), Principal Component Regression (PCR), Partial Least Squares Regression (PLSR), Sammon Mapping, Multidimensional Scaling (MDS), Projection Pursuit, Linear Discriminant Analysis (LDA), Mixture Discriminant Analysis (MDA), Quadratic Discriminant Analysis (QDA), Flexible Discriminant Analysis (FDA)), Ensemble Algorithms (e.g., Boosting, Bootstrapped Aggregation (Bagging), AdaBoost, Stacked Generalization (blending), Gradient Boosting Machines (GBM), Gradient Boosted Regression Trees (GBRT), Random Forest), SVM (support vector machine), supervised learning, unsupervised learning, semi-supervised learning, etc.

Additional examples of architectures include neural networks such as ResNet50, ResNet101, VGG, DenseNet, PointNet, and the like.

Figure 5:
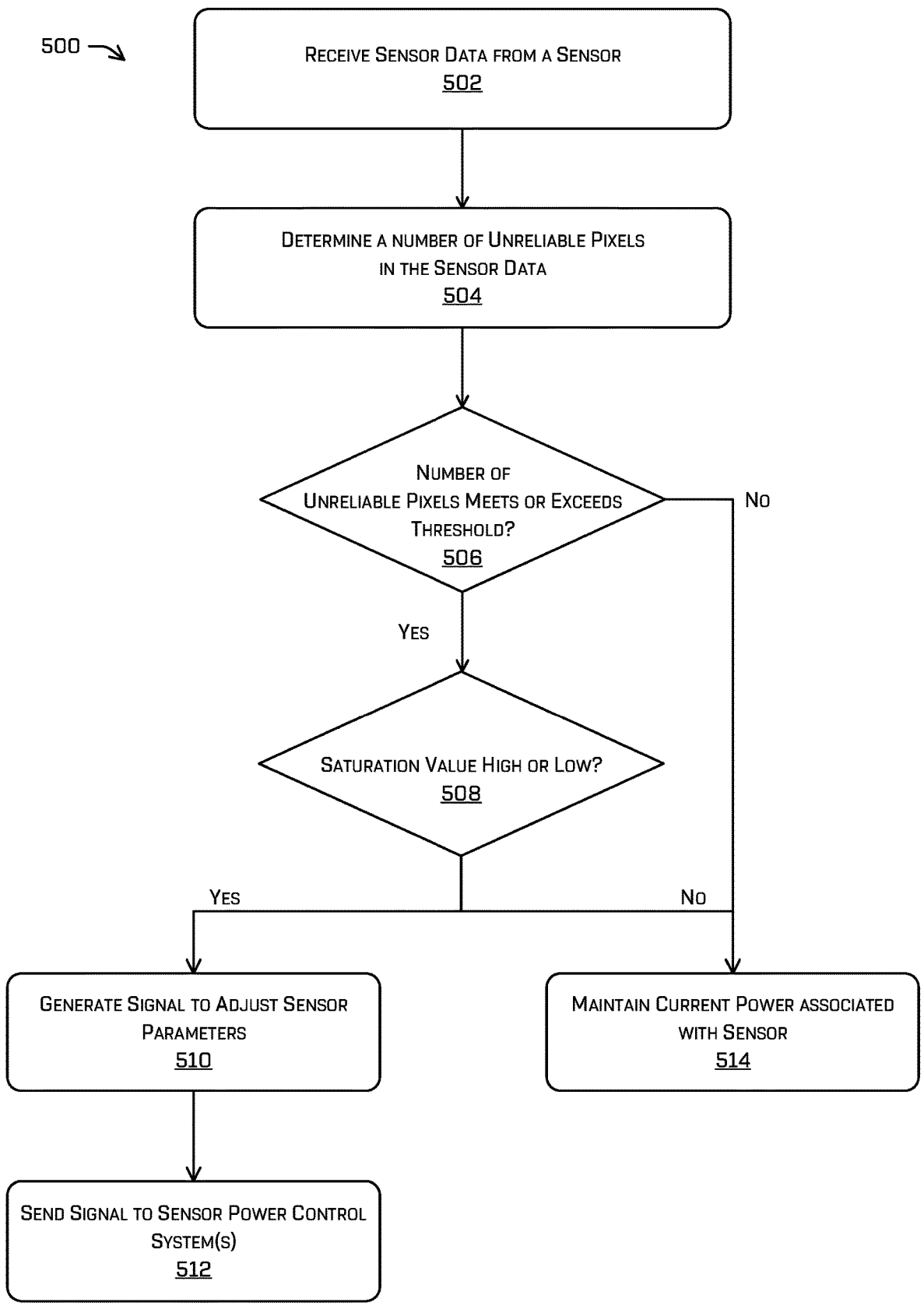
FIG. 5 is a flowchart illustrating an example method for dynamic power control in a sensor, such as a time-of-flight sensor, as described herein.
Figure 6:
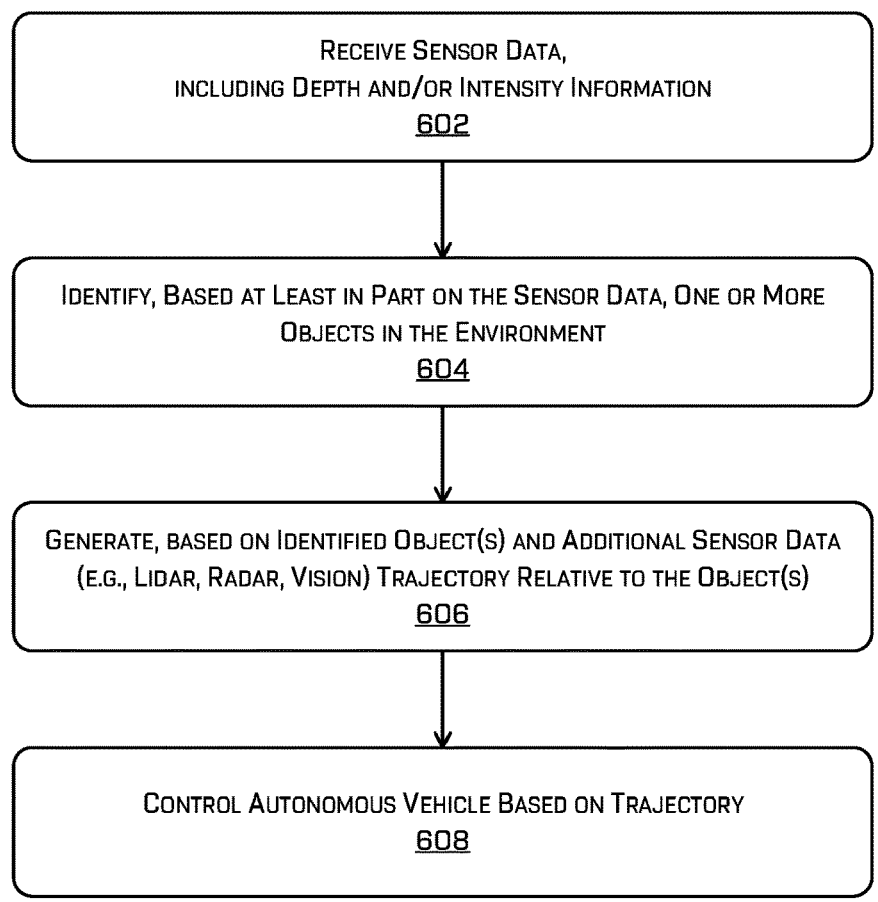
FIG. 6 is a flowchart illustrating an example method for controlling a vehicle relative to obstacles sensed by a sensor, such as a time-of-flight sensor, as described herein.

FIGS. 5 and 6 (and portions of FIG. 3, discussed above) illustrate example processes in accordance with embodiments of the disclosure. These processes are illustrated as logical flow graphs, each operation of which represents a sequence of operations that can be implemented in hardware, software, or a combination thereof. In the context of software, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described operations can be combined in any order and/or in parallel to implement the processes.

In more detail, FIG. 5 depicts an example process 500 for dynamic power control of a sensor system, such as a time-of-flight sensor. For example, some or all of the process 500 can be performed by the sensor system(s) 104 and/or by one or more components illustrated in FIG. 4, as described herein. For example, some or all of the process 500 can be performed by the sensor computing device(s) 408 of the sensor system(s) 406, including, but not limited to, the pixel evaluation component 438 and/or the power determination component 440. However, the process 500 is not limited to being performed by these components, and the components are not limited to performing the process 500.

At operation 502, the process 500 includes receiving sensor data. For example, techniques described herein may be useful for active control of a time-of-flight sensor based on sensor data received from the time-of-flight sensor. In these examples, the time-of-flight sensor may generate raw data, e.g., embodied as phase frames, and/or processed image data, e.g., a depth image describing depths for individual measured pixels and an intensity image describing intensities for the individual measured pixels.

At operation 504, the process 500 can include determining a number of unreliable pixels in the sensor data. For instance, and as described herein, pixels can be unreliable, or "bad," when phase frame information associated therewith fails to meet a certain characteristic or property. Pixels can also be unreliable if they are saturated. In examples, the operation 504 may determine the number of bad pixels for the image (which, as described herein, may correspond to pixels in either or both of the intensity image and the depth image and/or may be determined from the phase frames, e.g., in the absence of the intensity and/or depth images), and in some instances, the number of bad pixels may be compared to the number of good pixels, e.g., as a ratio.

At operation 506, the process 500 can include determining whether the number of unreliable pixels meets or exceeds a threshold. For instance, the operation 506 can include comparing the number of pixels determination at the operation 504 to a threshold number of pixels, which may be determined empirically, through heuristics, or otherwise. As noted above, in some implementations the operation 504 can include determining a ratio, e.g., of unreliable pixels to reliable pixels. In these examples, the operation 506 may alternatively include determining whether the ratio of unreliable pixels to reliable pixels meets or exceeds a threshold ratio.

If, at the operation 506, it is determined that the number of pixels (or the ratio) meets or exceeds the threshold, at operation 508 the process 500 can include determining whether a saturation value is high or low. For example, as described above in connection with Equation (1), a saturation value can be based on at least one of the number of unreliable pixels, an energy associated with those pixels, and/or additional intensity information. In examples, the operation 508 may use an intensity image, including a distribution of intensities of the unreliable pixels determined from the intensity image. For example, the saturation value may be compared to a first saturation value threshold and/or to a second, relatively higher second saturation value threshold. In examples, the operation 508 may determine that the saturation value is below the first saturation value threshold, which may indicate that power associated with the sensor can be increased. Or, the operation 508 may determine that the saturation value is above the second saturation value threshold, which may indicate that the power associated with the sensor is too high, and should be decreased.

If, at the operation 508, it is determined that the intensity of the unreliable pixels is either high or low, at operation 510 the process can include generating a signal to adjust the sensor parameters. For instance, the process 500 can determine new sensor parameters based on determining that a threshold number of pixels are unreliable (at the operation 506) and that those unreliable pixels skew toward high intensities or low intensities (at the operation 508). In examples, when the saturation value is relatively high, the signal to adjust the sensor parameters can be an instruction to lower a power associated with the sensor, e.g., by decreasing the illumination intensity and/or reducing an integration time. Conversely, when the saturation value is relatively low, the signal to adjust the sensor parameters can be an instruction to increase a power associated with the sensor, e.g., by increasing the illumination intensity and/or increasing the integration time.

At operation 512, the process 500 can also include sending the signal to one or more sensor power control systems. For example, the signal may be a signal to an emitter and/or a receiver of the time-of-flight sensor. Upon receipt of the power signal, the sensor may configure components of the sensor to implement the desired change. Accordingly, subsequent image data can be captured with the sensor adjusted to improve pixel capture.

Alternatively, if, at the operation 506, it is determined that the number of unreliable pixels (or the ratio of unreliable to reliable pixels) is below the threshold, of if, at the operation 508, it is determined that the intensity of the unreliable pixels is not high or low, at operation 514, the process 500 can include maintaining the current power associated with the sensor.

FIG. 6 depicts an example process 600 for controlling an autonomous vehicle relative to objects in an environment, as discussed herein. For example, some or all of the process 600 can be performed by the vehicle 102 of FIG. 1 and/or the vehicle 402 and its related components illustrated in and discussed with reference to, FIG. 4. For example, some or all of the process 400 can be performed by the localization component 422, the perception component 424, the planning component 426, and/or the one or more system controllers 428.

At operation 602, the process can include receiving sensor data, including depth and/or intensity information. The sensor data may include a depth image and an intensity image containing per-pixel values for pixels that were not identified as unreliable, e.g., in the process 500. Also in examples, the sensor data may include only those pixels associated with an object. The sensor data may be received from the time-of-flight sensor on a frame-by-frame basis, e.g., the sensor system may output data comprising a first frame (which includes both the depth image and the intensity image), a second frame, etc. In other examples, the sensor data may be a resolved frame, e.g., including blended intensity determined using multiple frames of data at different integration times and/or different illumination intensities and/or disambiguated depths. In still further embodiments the sensor data may be a representation of the environment, e.g., an image of the environment, generated using data from the time-of-flight sensor and/or data generated based on the data from the time-of-flight sensor.

At operation 604, the process 600 can include identifying, based at least in part on the filtered sensor data, one or more objects in the environment. For example, the localization component 422 and/or the perception component 424 may receive the depth and/or intensity data at 602 and identify objects in the environment. For example, the vehicle computing device(s) 404 may classify objects based on the sensor data and map the objects in the environment relative to the vehicle 402, e.g., using one or more maps like the map(s) 430. For instance, the depth and/or intensity information may be used, either alone or in combination with other data, to determine one or more bounding boxes, such as three-dimensional bounding boxes, representative of the sensed objects.

At operation 606, the process 600 can include generating, based on the identified object(s) and additional sensor data (e.g., LiDAR data, radar data, vision data), a trajectory relative to the object(s). For example, the planning component 426 of the vehicle computing device(s) 404 can further determine relative movement, e.g., velocity and acceleration, of the objects in the environment using one or more sensor modalities, object classification data, and the maps 430 and/or other information to determine the trajectory. For example, the trajectory may define at least a portion of a travel path for the vehicle. In some examples, the trajectory and/or travel path may be based at least in part on fused data including data from one or more sensor modalities, including a time-of-flight sensor, LiDAR, radar, or the like.

At operation 608, the process 600 can include controlling an autonomous vehicle to follow the trajectory. In some instances, the operation 608 can include generating commands that can be relayed to a controller onboard an autonomous vehicle to control the autonomous vehicle to drive the travel path. Although discussed in the context of an autonomous vehicle, the process 600, and the techniques and systems described herein, can be applied to a variety of systems utilizing sensors.

The various techniques described herein can be implemented in the context of computer-executable instructions or software, such as program modules, that are stored in computer-readable storage and executed by the processor(s) of one or more computers or other devices such as those illustrated in the figures. Generally, program modules include routines, programs, objects, components, data structures, etc., and define operating logic for performing particular tasks, or implement particular abstract data types.

Other architectures can be used to implement the described functionality, and are intended to be within the scope of this disclosure. Furthermore, although specific distributions of responsibilities are defined above for purposes of discussion, the various functions and responsibilities might be distributed and divided in different ways, depending on circumstances.

Similarly, software can be stored and distributed in various ways and using different means, and the particular software storage and execution configurations described above can be varied in many different ways. Thus, software implementing the techniques described above can be distributed on various types of computer-readable media, not limited to the forms of memory that are specifically described.

EXAMPLE CLAUSES

A: An example vehicle includes: a time-of-flight sensor configured to generate data based on light received at a receiver of the time-of-flight sensor; one or more processors; and memory storing processor-executable instructions that, when executed by the one or more processors, configure the vehicle to perform actions comprising: receiving sensor data from the time-of-flight sensor, the sensor data comprising a plurality of phase frames comprising phase values for a plurality of pixels; generating, based at least in part on the phase values, an intensity image including intensity information for the plurality of pixels; determining, based at least in part on the phase values, unreliable pixels in the measured data; determining, based at least in part on the intensity information, measured intensities for the unreliable pixels; generating, based at least in part on the measured intensities for the unreliable pixels, a signal to alter at least one of an illumination intensity or an integration time associated with the time-of-flight sensor; and sending the signal to the time-of-flight sensor.

B: The vehicle of example A, the actions further comprising: determining that a ratio of the unreliable pixels to a remainder of the plurality of pixels meets or exceeds a threshold ratio.

C: The vehicle of example A or example B, the actions further comprising: determining a saturation value for the sensor data, the saturation value being based at least in part on a number of the unreliable pixels and the intensity information, wherein the signal comprises at least one of a first signal to increase the illumination intensity or a second signal to increase the integration time when the saturation value is equal to or below a first threshold value, and wherein the signal comprises a third signal to decrease the illumination intensity or a fourth signal to reduce the integration time when the saturation value exceeds a second threshold value, the second threshold value being equal to or greater than the first threshold value.

D: The vehicle of any one of example A through example C, wherein determining a pixel to be an unreliable pixel comprises determining that a sum of the phase values associated with the pixel equals other than substantially zero.

E: The vehicle of any one of example A through example D, wherein: the plurality of phase frames comprises a first phase frame having a first phase value for a pixel of the plurality of pixels, a second phase frame having a second phase value for the pixel and being captured after the first phase frame, a third phase frame having a third phase value for the pixel and being captured after the second phase frame, and a fourth phase frame having a fourth phase value for the pixel and being captured after the third phase frame, and determining the unreliable pixels comprises determining the pixel to be an unreliable pixel when the sum of (i) a first difference between the third phase value and the first phase value and (ii) a second difference between the fourth phase value and the second phase value equals other than substantially zero.

F: The vehicle of any one of example A through example E, the actions further comprising: receiving, from the time-of-flight sensor with an altered illumination intensity or an altered integration time based on the signal, second sensor data; determining, based at least in part on the second sensor data, information about an object in the environment; determining a trajectory through the environment relative to the object; and controlling the vehicle to travel along the trajectory.

G: An example method includes: receiving, from a time-of-flight sensor, data comprising phase value information for a plurality of pixels; determining, based at least in part on the phase value information, unreliable pixels in the data; and generating, based at least in part on a ratio of the unreliable pixels to a total number of pixels meeting or exceeding a threshold ratio, a signal to change a sensing parameter of the time-of-flight sensor.

H: The method of example G, wherein the data further includes intensity information, the method further comprising: determining, based at least in part on the intensity information, an intensity distribution of the unreliable pixels, wherein the signal is based at least in part on the intensity distribution.

I: The method of example G or example H, further comprising: determining a saturation value associated with the data, the saturation value being based at least in part on a number of unreliable pixels and intensity information, wherein the signal comprises at least one of a first signal to decrease the illumination intensity or a second signal to reduce the integration time when the intensity distribution meets or exceeds a threshold value.

J: The method of any one of example G through example I, further comprising: determining, based on the intensity information, an energy associated with the unreliable pixels, wherein the saturation value is based at least in part on the energy.

K: The method of any one of example G through example J, wherein the saturation value is further based on a number of pixels having an intensity above a threshold intensity.

L: The method of any one of example G through example K, wherein determining the unreliable pixels comprises determining a pixel to be an unreliable pixel based at least in part on a sum of a plurality of phase values associated with the pixel equaling other than substantially zero.

M: The method of any one of example G through example L, wherein: the phase value information comprises a plurality of phase frames; the plurality of phase frames comprises a first phase frame having a first phase value for a pixel of the plurality of pixels, a second phase frame having a second phase value for the pixel and being captured after the first phase frame, a third phase frame having a third phase value for the pixel and being captured after the second phase frame, and a fourth phase frame having a fourth phase value for the pixel and being captured after the third phase frame, and determining the unreliable pixels comprises determining the pixel to be an unreliable pixel when the sum of (i) a first difference between the third phase value and the first phase value and (ii) a second difference between the fourth phase value and the second phase value is equals other than substantially zero.

N: The method of any one of example G through example M, further comprising: altering, based at least in part on the signal, the sensing parameter of the time-of-flight sensor; and receiving additional data from the time-of-flight sensor.

O: The method of any one of example G through example N, wherein the signal comprises a signal to alter at least one of an illumination intensity of an emitter of the time-of-flight sensor or an integration time of a receiver of the time-of-flight sensor.

P: An example system includes: one or more processors; and computer-readable storage media storing instructions executable by the one or more processors to perform operations comprising: receiving data generated by a time-of-flight sensor, the data comprising a plurality of phase frames comprising phase values for a plurality of pixels; determining, based at least in part on the plurality of phase frames, an intensity image including intensity information for the plurality of pixels; determining, based at least in part on the phase values, unreliable pixels in the measured data; determining, based at least in part on the intensity information, an intensity distribution associated with at least a subset of the plurality of pixels; generating, based at least in part on a ratio of unreliable pixels to a total number of pixels meeting or exceeding a threshold ratio and the intensity distribution, a signal to alter a power associated with the time-of-flight sensor; and controlling the power of the time-of-flight sensor based at least in part on the signal.

Q: The system of example P, wherein: determining a saturation value for the data, the saturation value being based at least in part on a number of the unreliable pixels and the intensity information, and the signal comprises a first signal to decrease the illumination intensity or a second signal to reduce the integration time when the saturation value meets or exceeds a threshold value.

R: The system of example P or example Q, wherein determining the unreliable pixels comprises determining a pixel to be an unreliable pixel based at least in part on a sum of a plurality of phase values associated with the pixel equaling other than substantially zero.

S: The system of any one of example P through example R, wherein: the plurality of phase frames comprises a first phase frame having a first phase value for a pixel of the plurality of pixels, a second phase frame having a second phase value for the pixel and being captured after the first phase frame, a third phase frame having a third phase value for the pixel and being captured after the second phase frame, and a fourth phase frame having a fourth phase value for the pixel and being captured after the third phase frame, and determining the unreliable pixels comprises determining the pixel to be an unreliable pixel when the sum of (i) a first difference between the third phase value and the first phase value and (ii) a second difference between the fourth phase value and the second phase value is equals other than substantially zero.

T: The system of any one of example P through example S, wherein determining the unreliable pixels comprises determining a pixel to be an unreliable pixel when the intensity information associated with the pixel indicates saturation.

CONCLUSION

While one or more examples of the techniques described herein have been described, various alterations, additions, permutations and equivalents thereof are included within the scope of the techniques described herein.

In the description of examples, reference is made to the accompanying drawings that form a part hereof, which show by way of illustration specific examples of the claimed subject matter. It is to be understood that other examples can be used and that changes or alterations, such as structural changes, can be made. Such examples, changes or alterations are not necessarily departures from the scope with respect to the intended claimed subject matter. While the steps herein can be presented in a certain order, in some cases the ordering can be changed so that certain inputs are provided at different times or in a different order without changing the function of the systems and methods described. The disclosed procedures could also be executed in different orders. Additionally, various computations described herein need not be performed in the order disclosed, and other examples using alternative orderings of the computations could be readily implemented. In addition to being reordered, in some instances, the computations could also be decomposed into sub-computations with the same results.

What is claimed is:

1. A vehicle comprising:
 a time-of-flight sensor configured to generate data based on light received at a receiver of the time-of-flight sensor;
 one or more processors; and
 memory storing processor-executable instructions that, when executed by the one or more processors, configure the vehicle to perform actions comprising:
  receiving sensor data from the time-of-flight sensor, the sensor data comprising a plurality of phase frames comprising phase values for a plurality of pixels;
  generating, based at least in part on the phase values, an intensity image including intensity information for the plurality of pixels;
  determining, based at least in part on the phase values, unreliable pixels in the measured data;
  determining that a ratio of the unreliable pixels to a remainder of the plurality of pixels meets or exceeds a threshold ratio;
  determining, based at least in part on the intensity information, measured intensities for the unreliable pixels;
  generating, based at least in part on the measured intensities for the unreliable pixels, a signal to alter at least one of an illumination intensity or an integration time associated with the time-of-flight sensor; and
  sending the signal to the time-of-flight sensor.

2. The vehicle of claim 1, the actions further comprising:
 determining a saturation value for the sensor data, the saturation value being based at least in part on a number of the unreliable pixels and the intensity information,
 wherein the signal comprises at least one of a first signal to increase the illumination intensity or a second signal to increase the integration time when the saturation value is equal to or below a first threshold value, and
 wherein the signal comprises a third signal to decrease the illumination intensity or a fourth signal to reduce the integration time when the saturation value exceeds a second threshold value, the second threshold value being equal to or greater than the first threshold value.

3. The vehicle of claim 1, wherein determining a pixel to be an unreliable pixel comprises determining that a sum of the phase values associated with the pixel equals other than zero.

4. The vehicle of claim 1, wherein:
 the plurality of phase frames comprises a first phase frame having a first phase value for a pixel of the plurality of pixels, a second phase frame having a second phase value for the pixel and being captured after the first phase frame, a third phase frame having a third phase value for the pixel and being captured after the second phase frame, and a fourth phase frame having a fourth phase value for the pixel and being captured after the third phase frame, and
 determining the unreliable pixels comprises determining the pixel to be an unreliable pixel when the sum of (i) a first difference between the third phase value and the first phase value and (ii) a second difference between the fourth phase value and the second phase value equals other than zero.

5. The vehicle of claim 1, the actions further comprising:
 receiving, from the time-of-flight sensor with an altered illumination intensity or an altered integration time based on the signal, second sensor data;
 determining, based at least in part on the second sensor data, information about an object in the environment;
 determining a trajectory through the environment relative to the object; and
 controlling the vehicle to travel along the trajectory.

6. A method comprising:
 receiving, from a time-of-flight sensor, data comprising phase value information for a plurality of pixels;
 determining, based at least in part on the phase value information, unreliable pixels in the data; and
 generating, based at least in part on a ratio of the unreliable pixels to a total number of pixels meeting or exceeding a threshold ratio, a signal to change a sensing parameter of the time-of-flight sensor.

7. The method of claim 6, wherein the data further includes intensity information, the method further comprising:
 determining, based at least in part on the intensity information, an intensity distribution of the unreliable pixels,
 wherein the signal is based at least in part on the intensity distribution.

8. The method of claim 7, further comprising:
 determining a saturation value associated with the data, the saturation value being based at least in part on a number of unreliable pixels and intensity information,
 wherein the signal comprises at least one of a first signal to decrease the illumination intensity or a second signal to reduce the integration time when the intensity distribution meets or exceeds a threshold value.

9. The method of claim 8, further comprising:
determining, based on the intensity information, an energy associated with the unreliable pixels,
wherein the saturation value is based at least in part on the energy.

10. The method of claim 9, wherein the saturation value is further based on a number of pixels having an intensity above a threshold intensity.

11. The method of claim 6, wherein determining the unreliable pixels comprises determining a pixel to be an unreliable pixel based at least in part on a sum of a plurality of phase values associated with the pixel equaling other than zero.

12. The method of claim 6, wherein:
the phase value information comprises a plurality of phase frames;
the plurality of phase frames comprises a first phase frame having a first phase value for a pixel of the plurality of pixels, a second phase frame having a second phase value for the pixel and being captured after the first phase frame, a third phase frame having a third phase value for the pixel and being captured after the second phase frame, and a fourth phase frame having a fourth phase value for the pixel and being captured after the third phase frame, and
determining the unreliable pixels comprises determining the pixel to be an unreliable pixel when the sum of (i) a first difference between the third phase value and the first phase value and (ii) a second difference between the fourth phase value and the second phase value is equals other than zero.

13. The method of claim 6, further comprising:
altering, based at least in part on the signal, the sensing parameter of the time-of-flight sensor; and
receiving additional data from the time-of-flight sensor.

14. The method of claim 6, wherein the signal comprises a signal to alter at least one of an illumination intensity of an emitter of the time-of-flight sensor or an integration time of a receiver of the time-of-flight sensor.

15. A system comprising:
one or more processors; and
computer-readable storage media storing instructions executable by the one or more processors to perform operations comprising:
receiving data generated by a time-of-flight sensor, the data comprising a plurality of phase frames comprising phase values for a plurality of pixels;
determining, based at least in part on the plurality of phase frames, an intensity image including intensity information for the plurality of pixels;
determining, based at least in part on the phase values, unreliable pixels in the measured data;
determining, based at least in part on the intensity information, an intensity distribution associated with at least a subset of the plurality of pixels;
generating, based at least in part on a ratio of unreliable pixels to a total number of pixels meeting or exceeding a threshold ratio and the intensity distribution, a signal to alter a power associated with the time-of-flight sensor; and
controlling the power of the time-of-flight sensor based at least in part on the signal.

16. The system of claim 15, wherein:
determining a saturation value for the data, the saturation value being based at least in part on a number of the unreliable pixels and the intensity information, and the signal comprises a first signal to decrease the illumination intensity or a second signal to reduce the integration time when the saturation value meets or exceeds a threshold value.

17. The system of claim 15, wherein determining the unreliable pixels comprises determining a pixel to be an unreliable pixel based at least in part on a sum of a plurality of phase values associated with the pixel equaling other than zero.

18. The system of claim 15, wherein:
the plurality of phase frames comprises a first phase frame having a first phase value for a pixel of the plurality of pixels, a second phase frame having a second phase value for the pixel and being captured after the first phase frame, a third phase frame having a third phase value for the pixel and being captured after the second phase frame, and a fourth phase frame having a fourth phase value for the pixel and being captured after the third phase frame, and
determining the unreliable pixels comprises determining the pixel to be an unreliable pixel when the sum of (i) a first difference between the third phase value and the first phase value and (ii) a second difference between the fourth phase value and the second phase value is equals other than zero.

19. The system of claim 15, wherein determining the unreliable pixels comprises determining a pixel to be an unreliable pixel when the intensity information associated with the pixel indicates saturation.

20. The system of claim 15, the operations further comprising:
determining, based on the intensity information, an energy associated with the unreliable pixels; and
determining a saturation value based at least in part on the energy.

* * * * *